MAGNETIC MATERIALS HAVING RECTANGULAR HYSTERESIS LOOPS

INVENTORS:
HIROSHI KITAGAWA
TOSHIO INOUE
SUSUMU KUROKAWA
SHINKICHI HORIGOME

H. Edward Masters

INVENTORS:
HIROSHI KITAGAWA
TOSHIO INOUE
SUSUMU KUROKAWA
SHINKICHI HORIGOME

H. Edward Mestern

INVENTORS:
HIROSHI KITAGAWA
TOSHIO INOUE
SUSUMU KUROKAWA
SHINKICHI HORIGOME

H. Edward Mestern

April 29, 1969 HIROSHI KITAGAWA ET AL 3,441,506

MAGNETIC MATERIALS HAVING RECTANGULAR HYSTERESIS LOOPS

Filed Aug. 30, 1967 Sheet 4 of 9

INVENTORS.
HIROSHI KITAGAWA
TOSHIO INOUE
SUSUMU KUROKAWA
SHINKICHI NORIGOME

BY:

H. Edward Mesters

INVENTORS:
HIROSHI KITAGAWA
TOSHIO INOUE
SUSUMU KUROKAWA
SHINKICHI HORIGOME
BY:
H. Edward Mostern INVENTORS:
HIROSHI KITAGAWA
TOSHIO INOUE
SUSUMU KUROKAWA
SHINKICHI HORIGOME
BY:
H. Edward Mostern INVENTORS:
HIROSHI KITAGAWA
TOSHIO INOUE
SUSUMU KUROKAWA
SHINKICHI HORIGOME
BY:
H. Edward Mestern

INVENTORS.
HIROSHI KITAGAWA
TOSHIO INOUE
SUSUMU KUROKAWA
SHINKICHI HORIGOME

BY,

H. Edward Mestern

INVENTORS:
HIROSHI KITAGAWA
TOSHIO INOUE
SUSUMU KUROKAWA
SHINKICHI HORIGOME
BY:
H. Edward Mestern

United States Patent Office 3,441,506
Patented Apr. 29, 1969

3,441,506

MAGNETIC MATERIALS HAVING RECTANGULAR HYSTERESIS LOOPS

Hiroshi Kitagawa, Toshio Inoue, Susumu Kurokawa, and Shinkichi Horigome, Tokyo-to, Japan, assignors to Kabushiki Kaisha Hitachi Seisakusho, Tokyo-to, Japan, a joint-stock company of Japan Continuation-in-part of application Ser. No. 344,005, Feb. 11, 1964. This application Aug. 30, 1967, Ser. No. 664,488.
Claims priority, application Japan, Feb. 12, 1963, 38/5,787
Int. Cl. C04b *35/38;* H01f *1/34*
U.S. Cl. 252—62.2 2 Claims

ABSTRACT OF THE DISCLOSURE

Magnetic materials most suitable for memory elements consists of 30–45 mol percent $Fe_2O_3$, 10–50 mol percent MnO, 10–40 mol percent MgO, and CuO in an amount of from trace to 20 mol percent, or of such magnetic materials with further addition of ZnO in an amount of from trace to 15 mol percent. The magnetic materials possess rectangular hysteresis loops of short switching time, high signal-to-noise ratio, low required driving current.

This application is a continuation-in-part of our copending application Ser. No. 344,005 filed Feb. 11, 1964, entitled, "Magnetic Materials Having Rectangular Hysteresis Loops," and now abandoned.

This invention relates to magnetic materials with rectangular hysteresis loops, and more particularly it relates to a new series of ferrites having rectangular hysteresis loops and having, furthermore, the unique combination of short switching time, high signal output voltage, high signal-to-noise ratio, and, moreover, low required driving current.

In general, the so-called ferrite cores with rectangular hysteresis loops are widely used as memory elements in large-capacity and high-speed electronic computers. Although the principal requirements for such ferrite cores to be used as memory cores for electronic computers are short switching time $\tau_s$, high disturbed voltage $dv_1$, large signal-to-noise ratio $S/N$, and low driving current, $Im$, these requirements call for mutually conflicting characteristics. In terms of magnetism, these electrical requirements correspond to a high flux density B and a coercive force $H_c$ which is substantially high. With respect to these requirements, the ferrites of the Mn-Cu and Cu-Mg series known heretofore have relatively small squareness ratios, and, because their $S/N$ ratios are low as a memory characteristic for practical applications, it is difficult to use these ferrites in actual practice. For this reason, ferrites of the Mn-Mg series have heretofore been used principally for such applications. However, even these ferrites have certain disadvantages as will be described hereinafter.

It is an object of the present invention to eliminate such disadvantages by providing a new series of ferrites having rectangular hysteresis and having, moreover, the unique combination of highly desirable characteristics as stated hereinbefore.

The foregoing objects and advantages as will presently become apparent have been achieved by the present invention, the specific nature and details of which will be best understood by reference to the following description, taken in conjunction with the accompanying drawings which are graphical representations, and in which.

Figure 5:
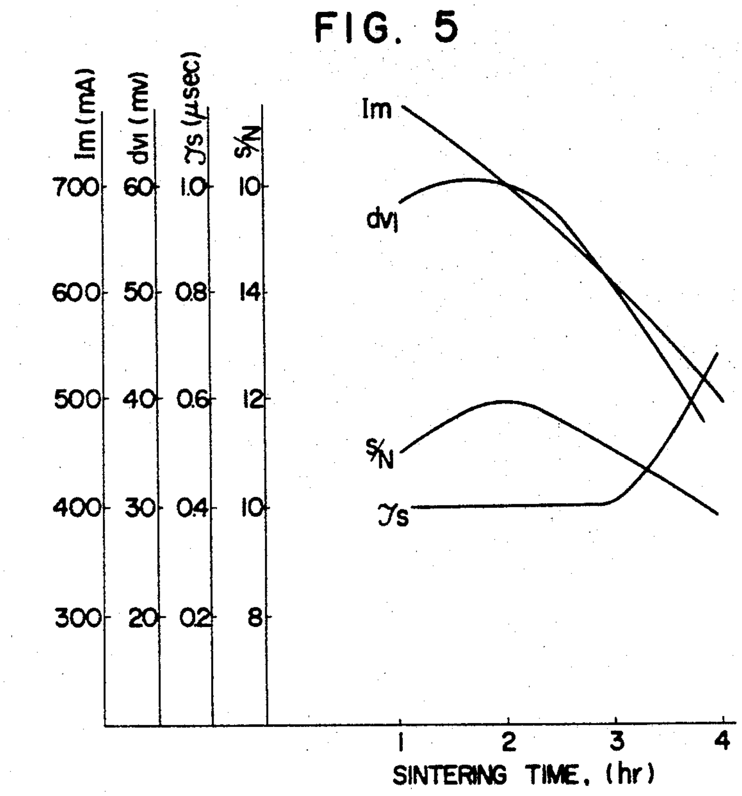
Figure 6:
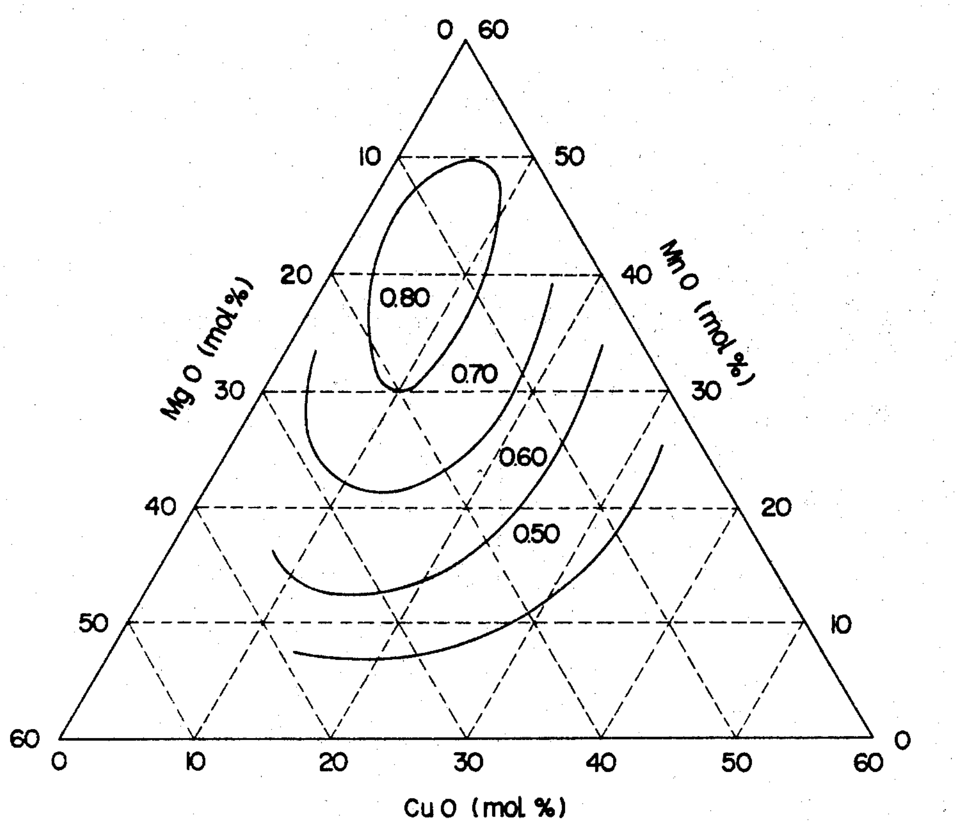
Figure 7:
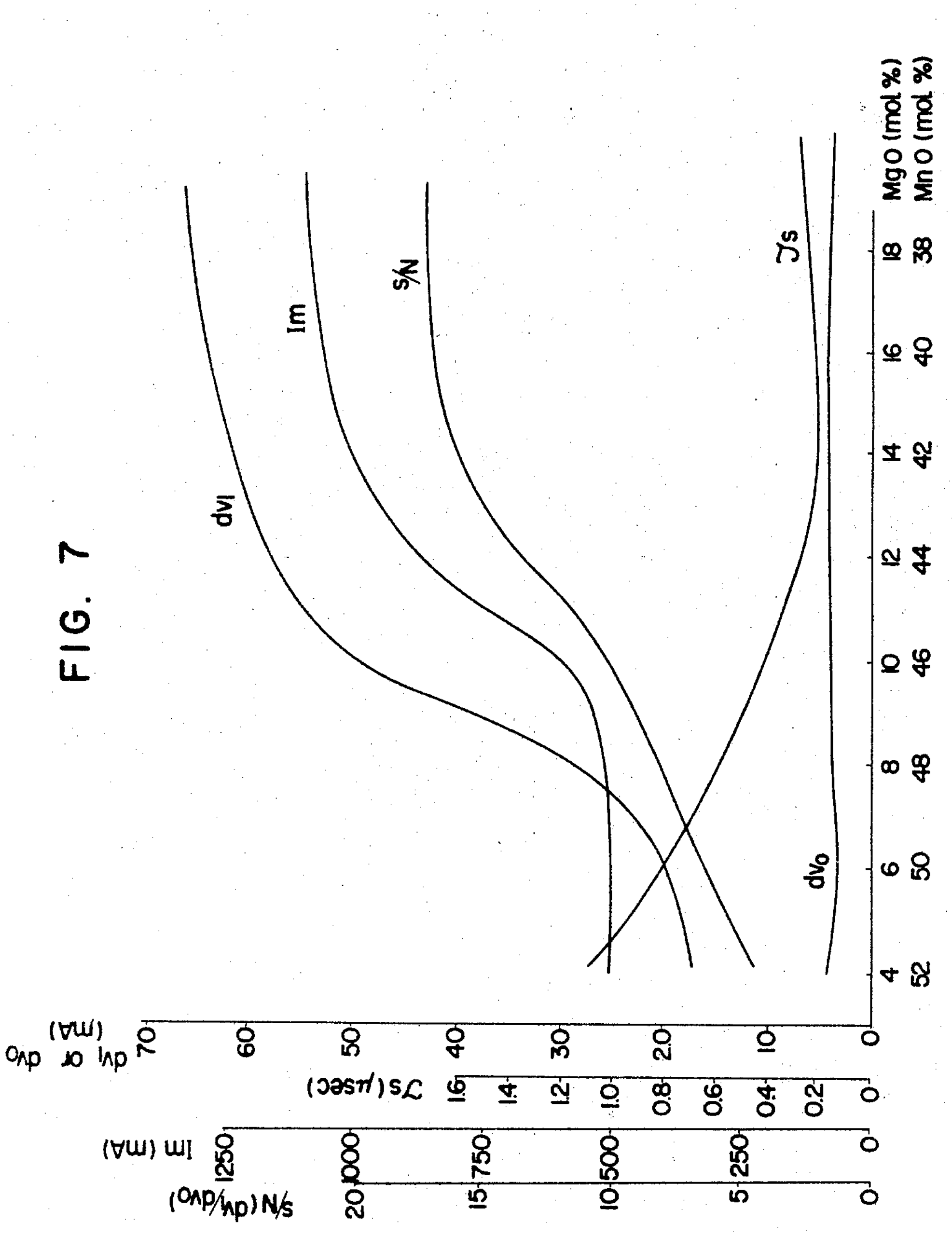
Figure 8:
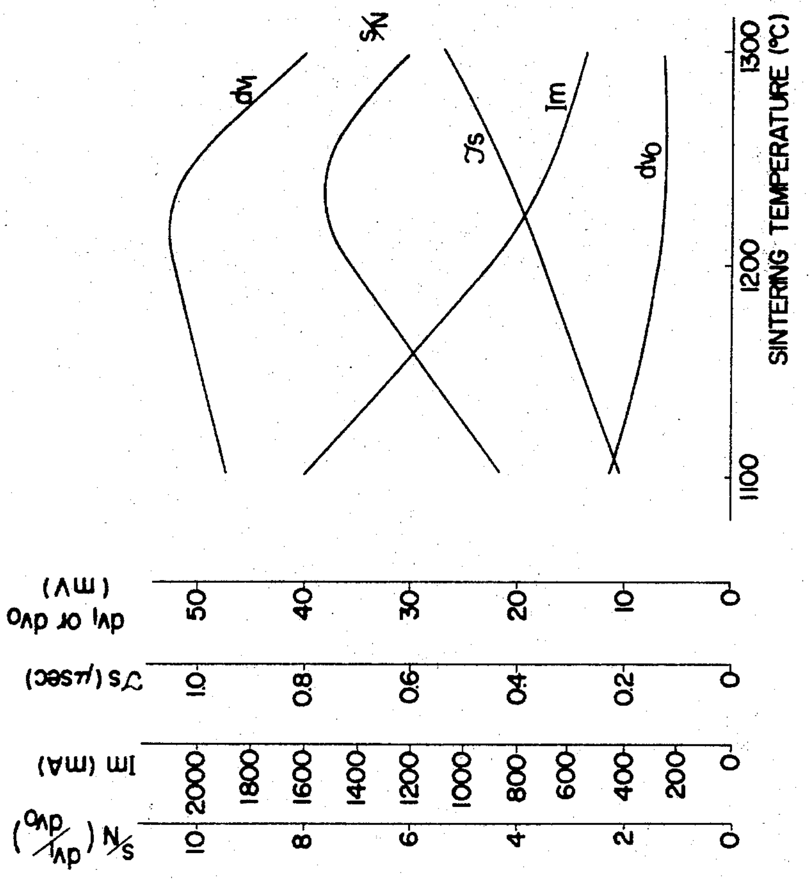
Figure 9:
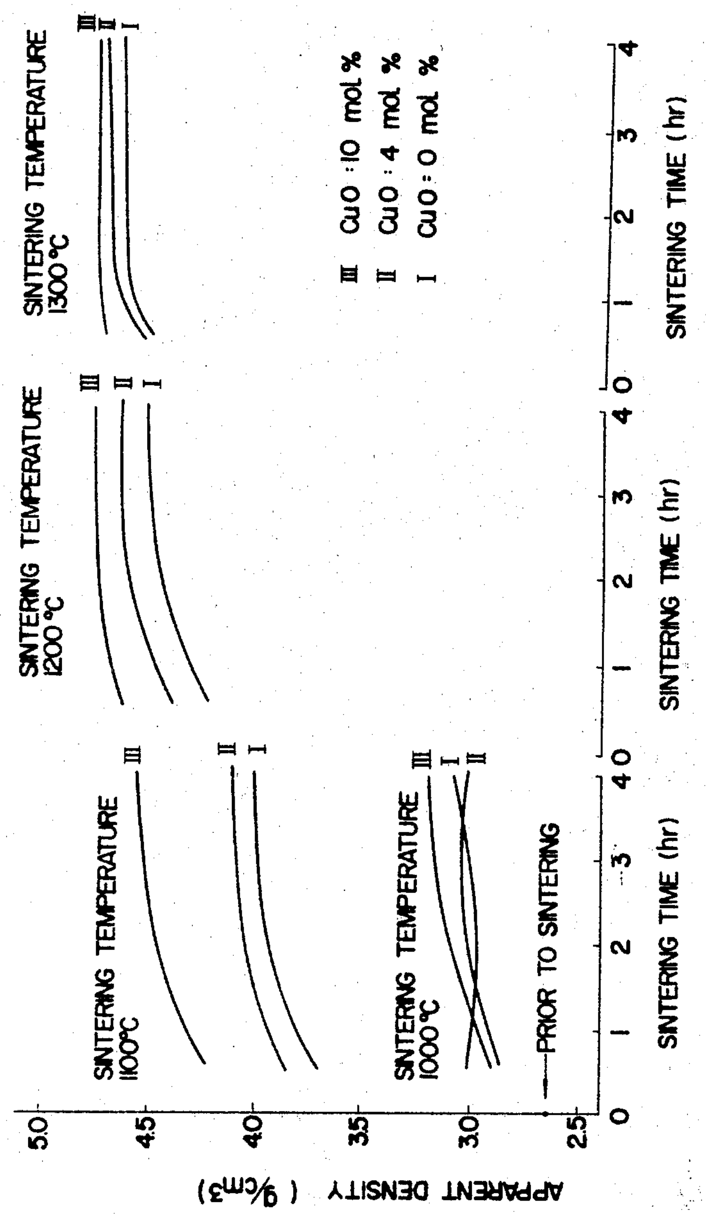
Figure 10:
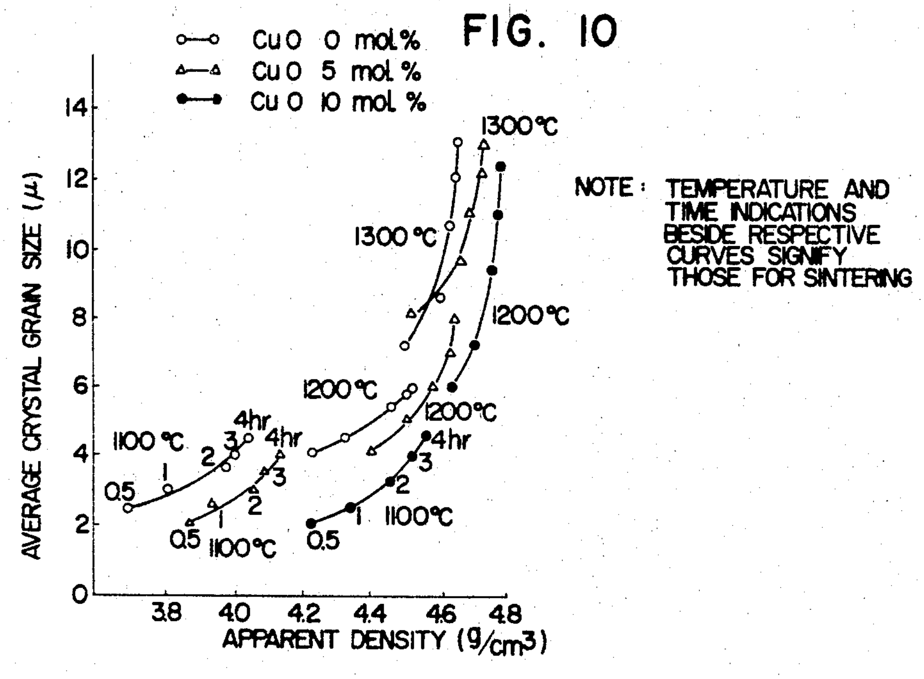
Figure 11:
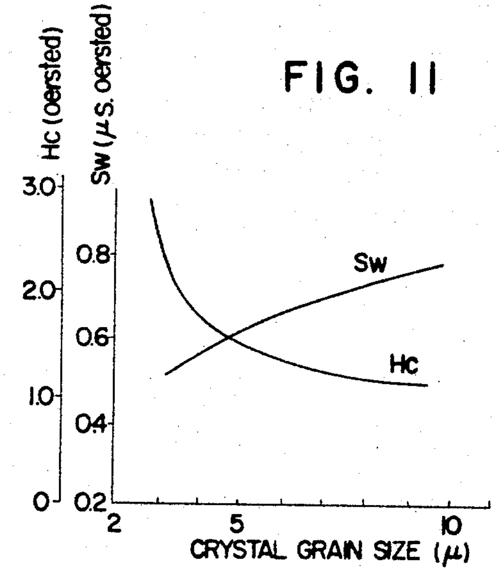
Figure 12:
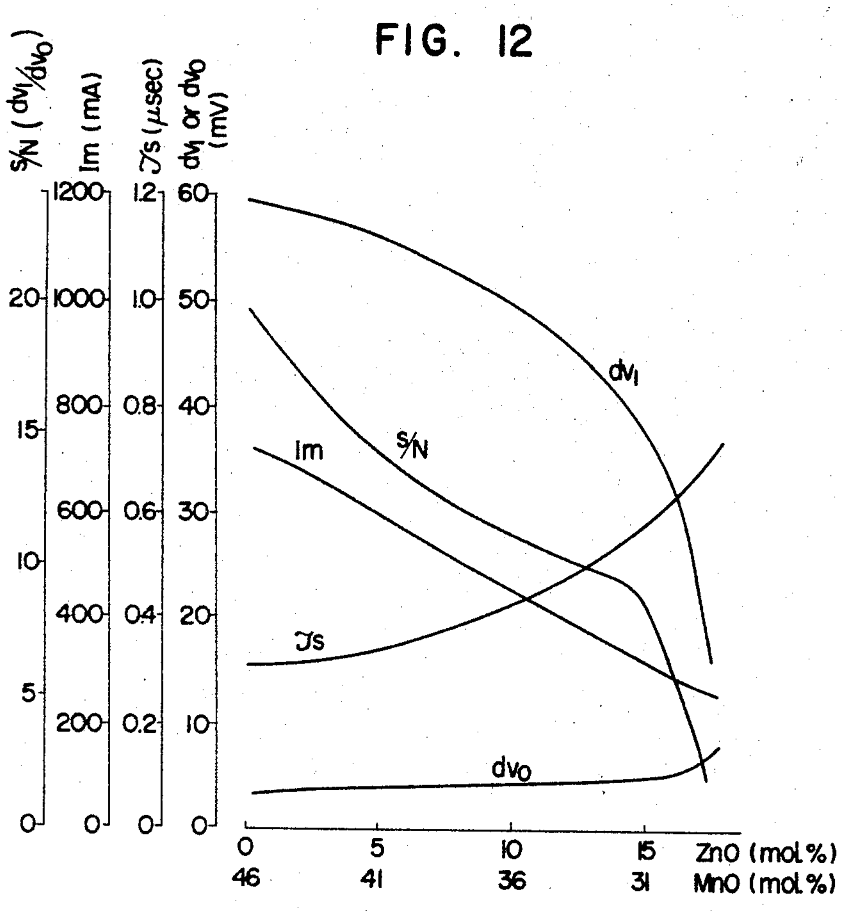
Figures 13, 14:
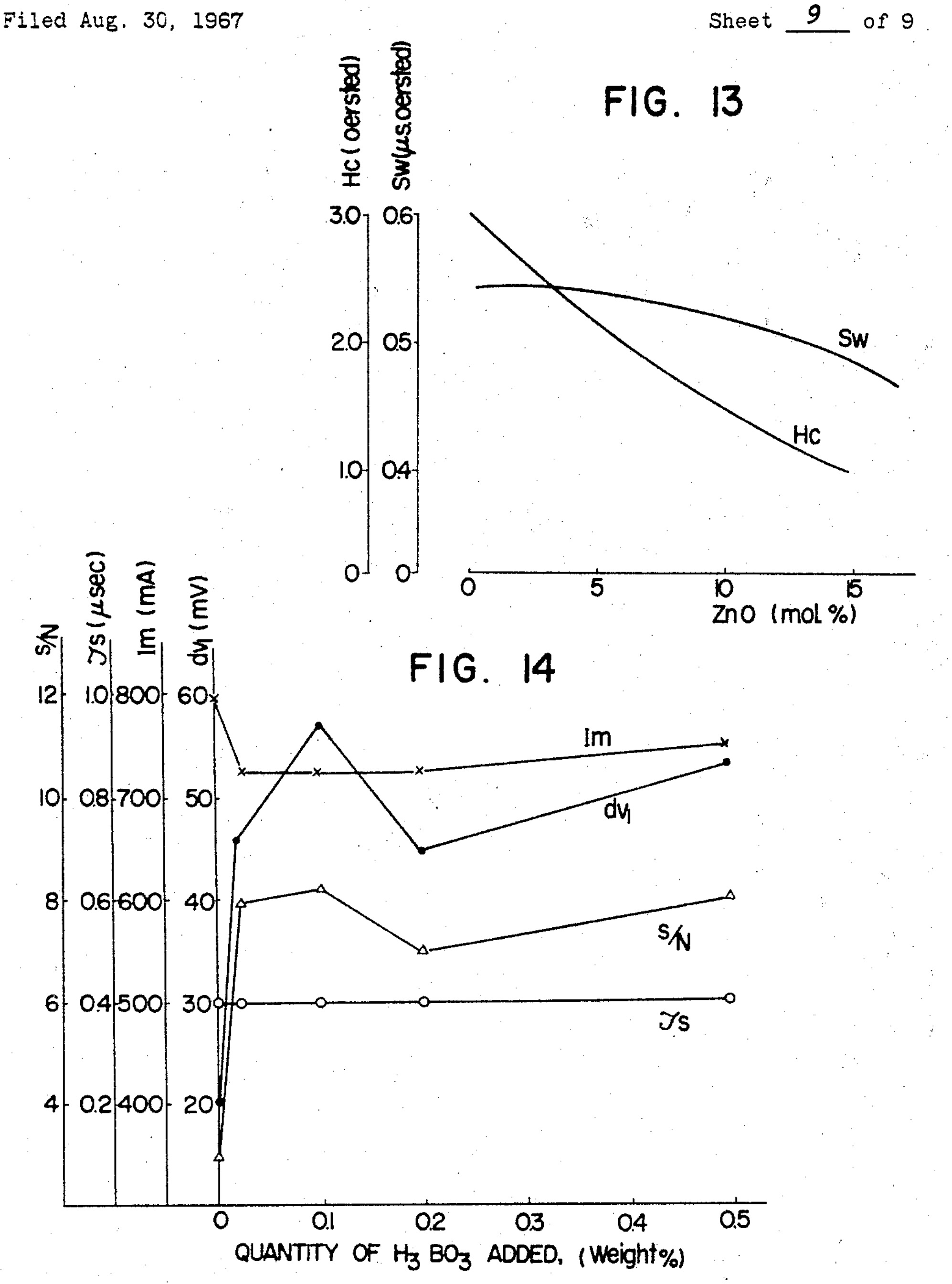

FIG. 5 indicates the variation of memory characteristics due to variation in sintering time of a ferrite of the MnO-MgO-CuO series;

FIG. 6 is a ternary diagram of the system $$MnO\text{-}MgO\text{-}CuO\text{-}Fe_2O_3$$

showing squareness ratios;

FIG. 7 are characteristic curves showing effects of MgO in the ferrite of $MnO\text{-}MgO\text{-}CuO\text{-}Fe_2O_3$ series to be given to the memory characteristics;

FIG. 8 are characteristic curves showing effects of sintering temperatures of the ferrite of $$MnO\text{-}MgO\text{-}CuO\text{-}ZnO\text{-}Fe_2O_3$$

series to be given to the memory characteristics;

FIG. 9 are characteristic curves showing relationships between the added quantity of CuO in the ferrite of $MgO\text{-}ZnO\text{-}MnO\text{-}CuO\text{-}Fe_2O_3$ series and the apparent density thereof;

FIG. 10 are characteristic curves showing relationships between the apparent density of $$MgO\text{-}ZnO\text{-}MnO\text{-}CuO\text{-}Fe_2O_3$$

series ferrite and average crystal grain size thereof;

FIG. 11 are characteristic curves showing relationships among the crystal grain size, switching coefficient, and coercive force in the $MgO\text{-}ZnO\text{-}MnO\text{-}CuO\text{-}Fe_2O_3$ series ferrite;

FIGS. 12 and 13 are, respectively, characteristic curves showing effects of ZnO in the $MgO\text{-}ZnO\text{-}MnO\text{-}CuO\text{-}Fe_2O_3$ series ferrite to be given to the memory characteristics; and FIG. 14 shows memory characteristics of the ferrite materials in case $H_3BO_3$ is added.

Figure 1:
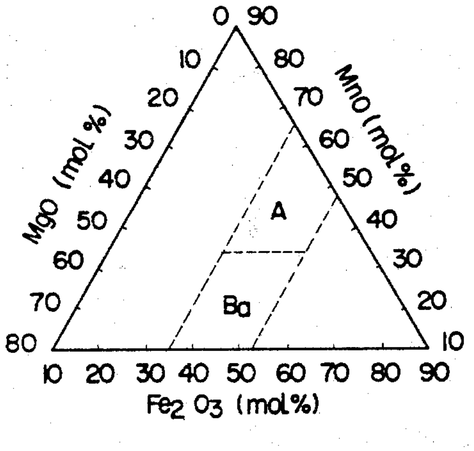
FIG. 1 is a ternary diagram of ferrites of the Mn-Mg series.

Referring to FIG. 1, which is a ternary diagram of Mn-Mg series ferrites, the ferrites of compositional mol ratios within the limits of the area A have higher flux density B but lower coercive force $H_c$ than those of mol ratios within the area B*a*. For this reason, sintering ferrites of compositions within the area A at a temperature of from 1,300 to 1,400 degrees C., as practiced heretofore, merely affords miniaturization, but it has not been possible, by this practice, to produce ferrites which fully satisfy the requirements such as miniaturization and shortening of switching time of memory cores necessary for increasing the speeds and capacities of computers, and which can withstand actual use with high signal output voltage.

Accordingly, in order to obtain ferrites of miniature size and high flux density B and coercive force $H_c$, attempts have been made, by utilizing the characteristic of high flux density of the ferrites corresponding to area A in FIG. 1, to control the grain size of the ferrite, through sintering temperature and time conditions, so as to increase the coercive force. In general, since the grain size becomes small when the sintering temperature is low, sintering ferrites of compositions in the area A at low temperatures will cause increase in their coercive force. However, it has heretofore been difficult to cause the B-H loops of such ferrites to assume square shapes to the degrees of squareness necessary for operation of the said ferrites as memory cores.

The present invention contemplates overcoming the above described difficulties and providing ferrites of compositions which can be represented by the following formula:

$$x\text{Fe}_2\text{O}_3\cdot y\text{MnO}\cdot z\text{MgO}\cdot u\text{CuO}\cdot w\text{ZnO}$$

where:

$x+y+z+u+w=100$ (mol percent)
30 mol percent $\leq x \leq$ 45 mol percent
10 mol percent $\leq y \leq$ 50 mol percent
10 mol percent $\leq z \leq$ 40 mol percent
0 mol percent $\leq u \leq$ 20 mol percent
0 mol percent $\leq w \leq$ 15 mol percent Further, the ferrite material of the following compositional ratio is particularly excellent as the ferrite core for the memory elements in respect to its squareness ratio, switching time, signal output voltage, signal-to-noise ratio, driving current, etc.

$35 \leq x \leq 43$
$25 \leq y \leq 50$
$10 \leq z \leq 30$
$3 \leq u \leq 15$
$0 \leq w \leq 10$ By the method according to the present invention, a mixture of the above indicated composition is first presintered at a temperature in the range of from 800 to 1,000 degrees C., and the resulting product is ground to produce a powder. A suitable binder is added to this powder, and the mixture is pressed into a ring of the required size, which ring is then sintered in air at a temperature of from 1,100 to 1,400 degrees C. The ring is then slowly cooled from the sintering temperature to approximately 1,000 degrees C. and is thereafter quenched. The above described sintering step may be alternatively carried out with the ring in a stream of nitrogen gas, in which case quenching is unnecessary, and slow cooling in the furnace is sufficient.

The compositions and characteristics of examples of ferrites produced by the above described method of the invention are shown in Table 1. The specific conditions under which these samples were produced are: the sintering time of from 1 to 3 hours; the sintering atmosphere consisting of air; and the quenching medium consisting of air. Measurements of characteristics were carried out at a temperature of 25 degrees C. on cores formed from respective mixtures of the samples, each core being 30 mils in its outer diameter, 20 mils in its inner diameter, and between 6 and 7 mils in thickness. (In Table 1, $dv_0$ denotes "disturbed voltage zero" or noise output, which will be described hereinafter.)

Figure 2:
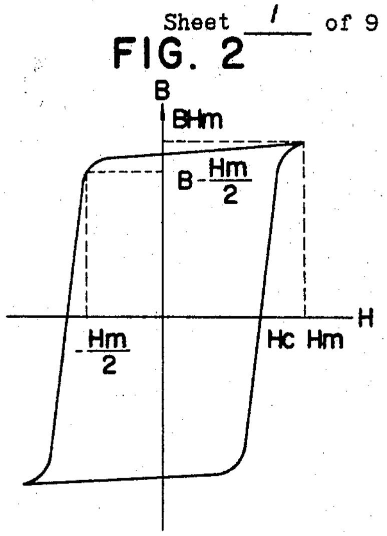
FIG. 2 shows a rectangular hysteresis loop, presented for the purpose of defining the term "squareness ratio"
Figure 3:
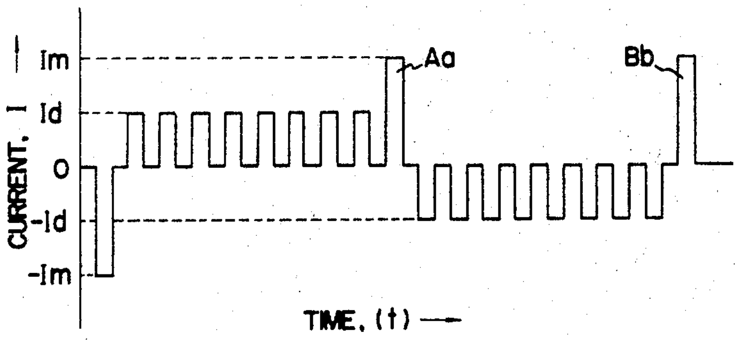
FIG. 3 is a current-time diagram for describing pulses for measuring a ferrite characteristic used in this invention as one criterion of the suitability of the ferrite for memory cores.

For the squareness ratio of a hysteresis loop, the value of $$R_s\left(=\frac{B-\frac{H_m}{2}}{BH_m}\right)_{max.}$$

determined from the magnetization curve as shown in FIG. 2 is generally used. The squareness ratio $R_s$ in this case is a function of the driving field $H_m$ and becomes a maximum at a certain value of $H_m$. However, since this squareness ratio $R_s$ is inadequate as a criterion by which to judge the suitability of memory cores for electronic computers, the examples, in the present invention, were studied on the basis of a practical characteristic measured by using current pulses as indicated in FIG. 3 in addition to the squareness ratio.

Figure 4:
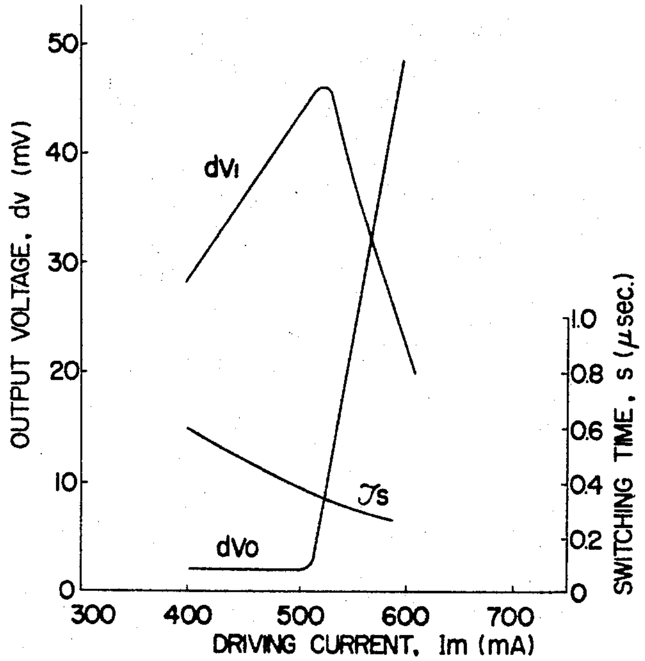
FIG. 4 shows characteristic curves, obtained by the method indicated in FIG. 3, of a memory core according to the present invention.

More explicitly, measurements were made with a pulse width of 2.5 $\mu$sec., a pulse rise time of 0.1 $\mu$sec., and disturbed ratio ($I_d/I_m$) of 0.5. The pulse height, that is, the driving current $I_m$, was varied and the signal output $dv_1$ and the noise output (disturbed voltage zero) $dv_0$ were respectively read with pulses $A_a$ and $B_b$ as shown in FIG. 3. The signal-to-noise ratio was represented by $S/N=dv_1/dv_0$. By this measurement, a characteristic graph as shown in FIG. 4 was obtained. The values of the signal output $dv_1$, the noise output $dv_0$, and the switching time $\tau_s$ at the point in this graph where the noise output $dv_0$ increases abruptly were taken as the characteristic value of each core.

FIG. 7 indicates the memory characteristics of the MnO-MgO-CuO-$Fe_2O_3$ series ferrite in the case of its compositional ratios being 37–52 mol percent MnO, 4–19 mol percent MgO, 4 mol percent CuO, 40 mol percent $Fe_2O_3$. In this case, as the added quantity of MgO increases, $dv_1$ and $S/N$ increase, and $\tau_s$ decreases. $I_m$ also increases under the sintering conditions of the sintering temperature of 1,150° C., the sintering time of 2 hours, and the quenching by air. By increasing the sintering temperature as described hereinbelow, it will be possible to decrease the value of the driving current, although, in this case, the value of the switching time $\tau_s$ becomes slightly larger. That is, as is apparent from the characteristic curves, presence of MgO in the ferrite material is effective in improving the memory characteristic thereof. The required memory characteristic can be obtained, if the MgO content ranges from 10 to 40 mol percent. When the Mgo content becomes more than 40 mol percent, the squareness ratio and $S/N$ ratio become smaller, hence the ferrite material becomes impractical to use.

TABLE 1

| Sample No. | Composition (mol percent) | | | | | Sintering temp. (° C.) | $I_m$ (ma.) | $dv_1$ (mv.) | $dv_0$ (mv.) | $\tau_s$ ($\mu$ sec.) | S/N |
|---|---|---|---|---|---|---|---|---|---|---|---|
| | $Fe_2O_3$ | MnO | MgO | ZnO | CuO | | | | | | |
| 1 | 40 | 41 | 10 | 5 | 4 | 1,150 | 500 | 44 | 2 | 0.45 | 22 |
| 2 | 40 | 36 | 10 | 10 | 4 | 1,150 | 420 | 51 | 2 | 0.3 | 26 |
| 3 | 38 | 28.6 | 27 | 1.4 | 5 | 1,230 | 750 | 52 | 6 | 0.4 | 7 |
| 4 | 36.9 | 46.2 | 10 | 2.9 | 4.0 | 1,130 | 750 | 80 | 4 | 0.3 | 20 |
| 5 | 40 | 31 | 25 | 0 | 4 | 1,200 | 850 | 46 | 3 | 0.4 | 15 |
| 6 | 40 | 31 | 10 | 15 | 4 | 1,150 | 320 | 44 | 3 | 0.35 | 15 |
| 7 | 40 | 43 | 13 | 0 | 4 | 1,150 | 950 | 60 | 4 | 0.4 | 15 |
| 8 | 40 | 40 | 10 | 0 | 10 | 1,150 | 550 | 30 | 4 | 0.7 | 9 |
| 9 | 38 | 23.6 | 32 | 1.4 | 5 | 1,300 | 650 | 38 | 4 | 0.55 | 7 |
| 10 | 40 | 31 | 10 | 15 | 4 | 1,150 | 320 | 44 | 3 | 0.35 | 14 |
| 11 | 40 | 18 | 25 | 13 | 4 | 1,200 | 290 | 30 | 2 | 0.8 | 15 |
| 12 | 42 | 41 | 10 | 3 | 4 | 1,150 | 650 | 34 | 2 | 0.5 | 17 |
| 13 | 40 | 26 | 30 | 0 | 4 | 1,200 | 800 | 50 | 6 | 0.35 | 8 |
| 14 | 40 | 20 | 30 | 8 | 2 | 1,200 | 580 | 37 | 3 | 0.55 | 12 |
| 15 | 40 | 40 | 10 | 6 | 4 | 1,120 | 540 | 60 | 3 | 0.4 | 20 |

NOTE.—$I_m$ denotes driving current; $dv_1$ denotes signal output voltage; $dv_0$ denotes disturbed voltage zero; $\tau_s$ denotes switching time; and S/N is signal-to-noise ratio.

Summarizing the measured characteristics of the examples shown in Table 1, driving current $I_m$ of from 300 to 1,000 ma., signal output voltage $dv_1$ of from 30 to 80 mv., switching time $\tau_s \geq 0.3$ $\mu$sec., and $S/N \geq 7$ were obtained.

FIG. 8 shows effects of sintering temperature to be given to the memory characteristic of the ferrite materials of 38 mol percent, $Fe_2O_3$, 27 mol percent MgO, 5 mol percent CuO, 28.6 mol percent MnO, and 1.4 mol percent ZnO sintered at various sintering temperature for two hours and air-quenched. It will be seen from this graphical representation that, with increase in the sintering temperature, the value of $I_m$ becomes smaller and $\tau_s$ becomes larger. Concurrently, the signal-to-noise ratio varies. Accordingly, by changing the sintering temperature in accordance with the purpose for use, a required memory characteristic can be obtained.

In the following, further explanations will be made as to the effect of addition of copper.

When cupric oxide (CuO) is added to the components of a composition in the area A of FIG. 1, the squareness ratio of the B—H curve increases at a temperature of from 1,100 to 1,200 degrees C., and the ferrite produced therefrom can be operated as a memory element. For example, with the addition of CuO on the order of 4 mol percent, a ferrite having a signal output value $dv_1$ of approximately 50 mv. and a switching time value $\tau_s$ of approximately 0.4 $\mu$sec. is obtained, wherefrom a 30-mil core having excellent characteristics can be produced. The only drawback is a driving current $I_m$ of 900 ma., which is slightly high. The effect derived from addition of copper is to enable the apparent density of the ferrite material to be increased at a same sintering temperature and sintering time as well as the average crystal grain size to be reduced, whereby the switching speed can be made slower.

FIG. 9 indicates relationships of the apparent density of the ferrite material having a composition represented by $(Fe_2O_3)_{40}$ $(MgO)_{10}$ $(ZnO)_{13.5}$ $(MnO)_{36.5-x}$ $(CuO)_x$, where $x$=0, 4, and 10 mol percent, with respect to the sintering time in each case, the sintering temperature being 1,000° C., 1,100° C., 1,200° C., and 1,300° C. respectively. In each case, the apparent density can be improved by the addition of copper, the effect of which is remarkable at the sintering temperature of 1,100° C. and 1,200° C.

FIG. 10 shows the relationship between the apparent density and the average crystal grain size of the ferrite material having the same composition as that of FIG. 9 above in relation to the sintering temperature and time, from which it is apparent that the addition of copper is effective to obtain ferrite materials of small average crystal grain size, and large apparent density. The apparent density of the material required as the memory core is approximately 4.5 g./cm.$^3$.

FIG. 11 shows relationships of the crystal grain size, coercive force $H_c$, and switching coefficient $Sw$ ($Sw=\tau_s \Delta H-H_c$), where $\tau_s$ is the switching speed, H is the external magnetic field, and $H_c$ is the coercive force). It will be seen from the drawing that when the crystal grain size becomes larger, the coercive force $H_c$ becomes small and the switching coefficient increases. Accordingly, it will be apparent from FIG. 10 that presence of CuO is effective to obtain this kind of ferrite material having high switch speed and uniform crystal grain size, and improved apparent density. Further, the quantitative limitation of CuO to be added is determined by decrease in the squareness ratio of the B—H curve, and the measured results thereof are shown in FIG. 6, which is a ternary diagram of squareness ratios $R_s$ in case of a ferrite of 40 mol percent of $Fe_2O_3$ sintered at 1,200° C. for 2 hours and then quenched in air. From the graphical representation, it is found that the added quantity of CuO is desirably less than 20 mol percent. It has been found that when ZnO is added to the above-described components to cause a reduction in the coercive force $H_c$ of the material itself and to cause, also, an increase in the flux density, the driving current $I_m$ becomes lower. In a specific instance, by the addition of ZnO, a ferrite having a driving current $I_m \geq 350$ ma., an output voltage $dv_1$ of 30 to 70 mv., a switching time $\tau_s \geq 0.3$ $\mu$sec., and a signal-to-noise ratio $S/N \geq 7$ was obtained. The switching time of 0.3 $\mu$sec. obtained in this case has never been attained by ferrite materials known heretofore as far as the applicants are aware.

FIG. 12 is a graphical representation showing the memory characteristics of a ferrite material composed of 40 mol percent $Fe_2O_3$, 10 mol percent MgO, 4 mol percent CuO, 0–17 mol percent ZnO, and 29–46 mol percent MnO which has been sintered at a sintering temperature of 1,150° C. for 2 hours and then air-quenched. As seen, the driving current $I_m$ can be made smaller by adding ZnO. On the contrary, however, the $S/N$ ratio is reduced and the switching time $\tau_s$ becomes larger with increase in added quantity of ZnO. When the crystal grain size is made uniform, the coercive force $H_c$ and the switching coefficient become smaller by addition of ZnO. FIG. 13 indicates this relationship, wherein the ferrite material composed of $$(MnO)_{46-x} \cdot (ZnO)_x \cdot (MgO)_{10} \cdot (CuO)_4 \cdot (Fe_2O_3)_{40}$$

is sintered at a temperature of 1,150° C. for 2 hours and then air-quenched. The curves show that, when the driving current $I_m$ is constant, it is possible to reduce the switching speed by the addition of ZnO.

As mentioned in the foregoing, if the ZnO constant is less than 15 mol percent, a desired object can be attained as is clearly shown in FIGS. 12 and 13. That is, when the ZnO content becomes more than 15 mol percent, the squareness of the hysteresis loop deteriorates and the $S/N$ ratio is reduced, hence the ferrite material becomes unable to be utilized as the memory core.

It has been found, furthermore, that in case ZnO alone is added without addition of CuO, sintering of more than 10 hours is necessary at a temperature as low as 1,100 to 1,250 degrees C. However, when CuO is added, the signal output $dv_1$ attains its maximum value after sintering of 1 to 3 hours. One example is illustrated in FIG. 5 which indicates the memory characteristics in the case of a ferrite produced by sintering a mixture material composed of 40 mol percent of $Fe_2O_3$, 46 mol percent of MnO, 10 mol percent of MgO, and 4 mol percent of CuO in air at 1,200 degrees C., then quenching the same.

Also, in the case of compositions within the area $B_a$ in FIG. 1, it is possible, by adding ZnO and CuO and controlling the sintering temperature and time, to produce a 30-mil core having signal output voltage $dv_1 \leq 50$ mv. and switching time $\tau_s \geq 0.4$ $\mu$sec. However, such cores produced from compositions within the said area $B_a$ have relatively high values of driving current $I_m$.

Still further, it has been found that by adding $H_3BO_3$ to the above-described mixture composition, it is possible to produce memory cores by a sintering process involving substantially low temperature and relatively short time. A specific example is illustrated in FIG. 14, which indicates the memory characteristics of a ferrite in the case wherein $H_3BO_3$ is added to a material containing 40 mol percent of $Fe_2O_3$, 46 mol percent of MnO, 10 mol percent of MgO, and 4 mol percent of CuO, and the resulting mixture is sintered in air at 1,100 degrees C. for 2 hours, then quenched. Even a material of such a composition that it cannot be used at all as memory core without the addition of $H_3BO_3$ is rendered into a material exhibiting excellent characteristics by the addition of 0.02 percent by weight of $H_3BO_3$. The proportion of this $H_3BO_3$ added may be increased up to 0.5 percent by weight without adversely affecting the characteristics of the final product, and, although the driving current becomes high, it is possible to produce a memory core of short switching time and high output. Moreover, it is possible to obtain such a ferrite of a high squareness ratio through low temperature sintering.

While, in the foregoing examples, the description relates to 30-mil cores, it is, of course, possible to produce excellent memory cores by using materials of the above-described compositions according to the invention for, for example, 12-mil, 20-mil, 50-mil and 80-mil cores, in addition to 30-mil cores.

As has been explained in the foregoing, the ferrite materials of Fe-Mn-Mg-Cu as well as Fe-Mn-Mg-Zn-Cu series possesses short switching time, high signal output voltage, high signal-to-noise ratio, and low required driving current, so that it is most suited as the ferrite core for the memory elements. Moreover, the ferrite material can be produced at relatively low sintering temperature and for a short sintering time.

What we claim is:

1. A ferrite magnetic material having rectangular hysteresis loop characteristics consisting essentially of 35–43 mol percent of $Fe_2O_3$, 25–50 mol percent of MnO, 10–30 mol percent of MgO, and 3–15 mol percent of CuO.

2. A ferrite material according to claim 1, further added with ZnO in an amount of from trace to 10 mol percent.

References Cited

UNITED STATES PATENTS 3,042,619 7/1962 Brownlow -------- 252—62.64
3,177,145 4/1965 Brownlow -------- 252—62.64
3,188,290 6/1965 Dam et al. -------- 252—62.62

TOBIAS E. LEVOW, *Primary Examiner.*

R. D. EDMONDS, *Assistant Examiner.*

U.S. Cl. X.R.

252—62.62, 62.64